United States Patent [19]

Rumler

[11] Patent Number: 5,720,525
[45] Date of Patent: Feb. 24, 1998

[54] VEHICLE SEAT WITH ANTI-RATTLE ARM REST

[75] Inventor: Thomas Christopher Rumler, Bristol, Ind.

[73] Assignee: Excell, Inc., Elkhart, Ind.

[21] Appl. No.: 792,017

[22] Filed: Feb. 3, 1997

[51] Int. Cl.[6] ........................................ A47C 7/54
[52] U.S. Cl. ............................ 297/411.32; 297/411.2
[58] Field of Search ......................... 297/411.2, 411.3, 297/411.32, 411.38, 411.39; 248/222.41

[56] References Cited

U.S. PATENT DOCUMENTS

| | | | |
|---|---|---|---|
| 4,040,665 | 8/1977 | Wallace et al. | 297/411.32 |
| 4,707,032 | 11/1987 | Chang | 297/411.32 X |
| 5,056,868 | 10/1991 | Beck | 297/411.32 X |
| 5,088,791 | 2/1992 | Conley et al. | 297/411.32 |
| 5,316,373 | 5/1994 | Markel | 297/411.32 |
| 5,567,016 | 10/1996 | Koprowski . | |
| 5,630,644 | 5/1997 | LaPointe et al. | 297/411.32 X |

Primary Examiner—Milton Nelson, Jr.
Attorney, Agent, or Firm—Banner & Witcoff, Ltd.

[57] ABSTRACT

An anti-rattle arm rest for a motor vehicle seat assembly, particularly for seat assemblies used in for van conversions, having a seat base, a seat back, and an arm bracket preferably fixedly attached to the seat back. The arm bracket has at least three walls, the first and second walls facing one another, and the third wall connecting the first and second walls. An arm is connected to the seat back at the arm bracket, and is movable from an up position generally parallel with the seat back to a down position generally parallel with the seat base. Extending perpendicularly from the arm is a rod which is insertable into and through first and second openings in corresponding first and second walls. A pin having a diameter extends perpendicularly from the rod. The arm bracket has a pin receiving groove which snugly releasably receives the pin when the arm enters the down position. Preferably the diameter of the groove is less than the diameter of the pin such that the pin is inserted into the groove with a force or interference fit. Optionally the groove may be Y-shaped to guide the pin to the center of the groove.

12 Claims, 6 Drawing Sheets

ATTACHMENT A

VEHICLE SEAT WITH ANTI-RATTLE ARM REST

FIELD OF THE INVENTION

The present invention generally relates to mechanisms for seats and seat assemblies having pivoting arms, and more particularly to improved seat designs reducing extraneous noises generated by vibrational forces.

BACKGROUND OF THE INVENTION

Seat assemblies, particularly seat assemblies used on motor vehicles, are subjected to competing design constraints. On the one hand, there is relentless customer pressure to reduce the cost of such seat assemblies. On the other hand, the customer also desires minimization or elimination of squeaks, rattles and buzzes. Reducing such noises typically drives up the cost of motor vehicle seat assemblies. Furthermore, since overall motor vehicles have become quieter, the noises that remain become all the more apparent, creating additional need to reduce noises where they still exist.

Noise is often a concern with parts that are intended or allowed to move relative one another. For motor vehicle seat assemblies having a seat base, a seat back, and a pivotable armrest attached to the seat back, one source of potential noise is the interconnection between the armrest and the seat back. In certain known designs, this interconnection is made by an arm bracket which received a pin projecting from a rod attached to an arm. The arm is moveable from a down position in which it normally rests, to an up position to which it may be moved to by an occupant of the motor vehicle seat assembly. In such designs, rattling is limited somewhat by the cushioning material, often a foam padding, positioned around the armrest for occupant comfort. This minimal control of noise does not adequately address the central problem of two parts movable relative one another. It would be highly advantageous to further reduce noises at the interconnection between the armrest and the seat back.

In view of the foregoing, it is an object of the present invention to provide a motor vehicle seat assembly with an elegant design which minimizes squeaks, rattles and buzzes.

It is an additional object of the present invention to provide an anti-rattle armrest for a motor vehicle seat assembly of low cost and complexity while enhancing manufacturability and reliability.

It is yet another related object of the present invention to provide such a motor vehicle seat assembly with an anti-rattle arm rest that is highly reliable in operation.

SUMMARY OF THE INVENTION

In accordance with these and other objects, the present invention provides an elegant solution to the competing demands of minimizing squeaks and rattles while maintaining low cost in the seat assembly. In accordance with a first aspect, there is provided an anti-rattle arm bracket for use on a motor vehicle seat assembly. The bracket preferably has at least three walls with the first and second walls positioned generally parallel one another and the third wall connecting the first and second walls. The bracket is attached to the seat back, preferably being rigidly attached to a structural frame of the seat back. An arm is preferably rotatably and slidably attached to the arm bracket by a rod which can be inserted through first and second openings positioned respectively in the first and second walls, respectively. The arm is rotatable from an up position extending substantially vertically upward from the bracket to a down position extending substantially horizontally forward (that is, away from the seat back, substantially parallel to the seat cushion).

In a highly advantageous feature, as the arm approaches the down position a pin extending radially from the rod is slidably, snugly received into a pin-receiving groove in the third wall. Preferably, the groove is somewhat Y-shaped, having a narrow stem or bottom branching into a wider top. The diameter of the pin exceeds the width of the bottom of the groove so as to form an interference fit, and most preferably a wedge fit. An interference fit is a force fit or a wedge fit. In an interference fit typically the opening or groove has a width that reduces toward the bottom to be 0.05–0.01% smaller than the diameter of the pin. In preferred embodiments a wedge fit accommodates wear due to repeated cycling into and out of the down position. In the wedge fit typically the opening or groove is smaller relative the pin than in a force fit. This creates a tight but releasable fit between the arm and the arm bracket which advantageously greatly reduces rattling as the arm is moved to the down position.

In accordance with a second aspect, an anti-rattle armrest for a seat assembly has an arm pivotably moveable from an up position to a down position. A rod is rigidly attached to the arm, and a pin extends transversely from the arm. The arm bracket is attached to the seat assembly, preferably rigidly attached and sized to receive the rod and the pin. In particular, the arm bracket preferably has a Y-shaped pin receiving groove, and the pin is snugly, releasably receivable into the pin receiving groove upon movement of the arm towards the down position. The diameter of the pin exceeds the width of the pin receiving groove, forming at least a force fit or interference fit, more preferably a wedge fit.

In accordance with a third aspect, a motor vehicle seat assembly has a seat base and a seat back. A pair of arm brackets are affixed to the seat back for mounting a pair of arms having the walls and the openings as discussed above. A groove in each arm bracket is sized to snugly, releasably receive a pin extending from a rod on the arm. The pin, extending from each arm to its respective arm bracket, has a diameter which exceeds the width of the groove, producing at least an interference fit and more preferably a wedge fit. Cushions and cushioning materials preferably are attached to the seat base, seat back and arm.

From the foregoing disclosure and the following more detailed description of various preferred embodiments it will be apparent to those skilled in the art that the present invention provides a significant advance in the technology and art of armrests for seat assemblies. Particularly significant in this regard is the potential the invention affords for reduced or minimized rattling and noises in response to vibrational forces and enhancing aesthetics while reducing cost, manufacturing steps and complexity. Additional features and advantages of various preferred embodiments will be better understood in view of the detailed description provided below.

Figures 1, 2:
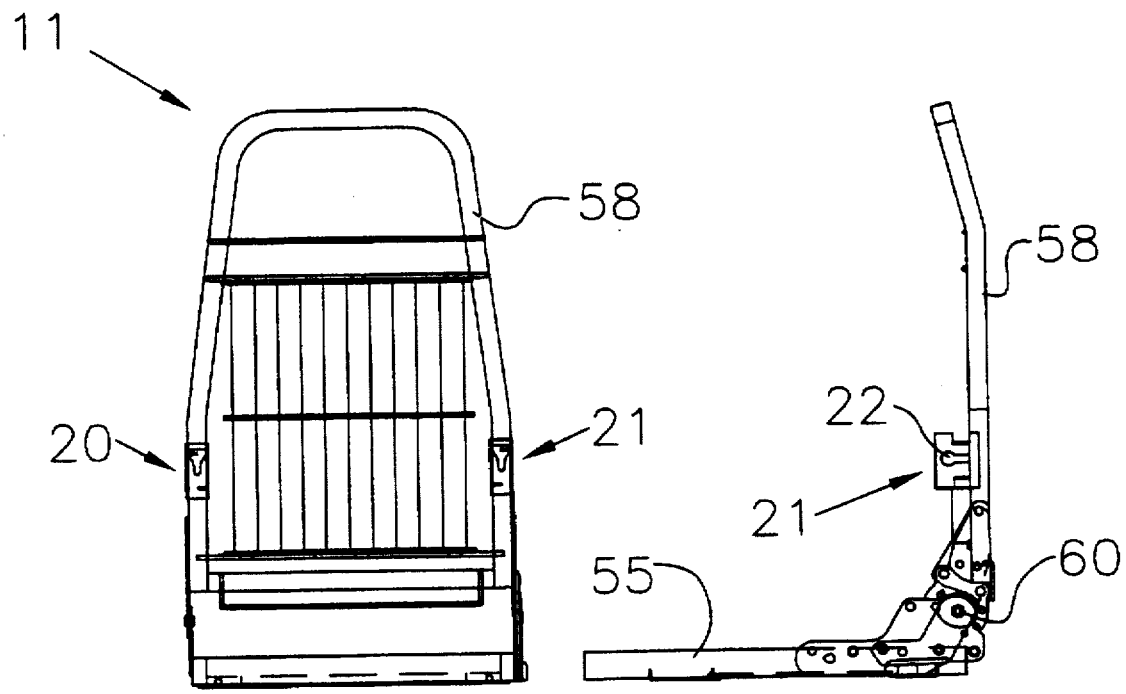
FIGS. 1–3 are front and side and top views of a motor vehicle seat assembly framing, including a seat base hingedly attached to a seat back, with the cushioning removed revealing anti-rattle armrest brackets attached to the seat back in accordance with a preferred embodiment.

It should be understood that the appended drawings are not necessarily to scale, presenting a somewhat simplified representation of various preferred features illustrative of the basic principles of the invention. The specific design features of a seat assembly with an anti-rattle armrest as disclosed here, including, for example, the angle the Y-shaped slot makes with the vertical, the length of the arm and the choice of cushioning materials will be determined in part by the particular intended application and use environment. Certain features of the illustrated embodiments have been enlarged or distorted relative to others to facilitate visualization and clear understanding. In particular, thin features may be thickened, for clarity of illustration, as for example the low friction coating applied to the lower track. All references to direction and position, unless otherwise indicated, refer to the orientation of the seat assembly illustrated in the drawings. In general, lateral or laterally refers to a rightward or leftward direction when facing the seat assembly and up, down or vertical refers to corresponding up, down and vertical directions.

DETAILED DESCRIPTION OF CERTAIN PREFERRED EMBODIMENTS

It will be apparent to those skilled in the art, that is, to those who have knowledge or experience in this area of technology, that many uses and design variations are possible for the seat assembly incorporating an anti-rattle arm rest as disclosed herein. The following detailed discussion of various alternative and preferred features and embodiments will illustrate the general principles of the invention with reference to a seat assembly suitable for use in a motor vehicle, particularly suitable for use in the van conversion market. Other embodiments suitable for other applications will be apparent given the benefit of this disclosure.

Figure 3:
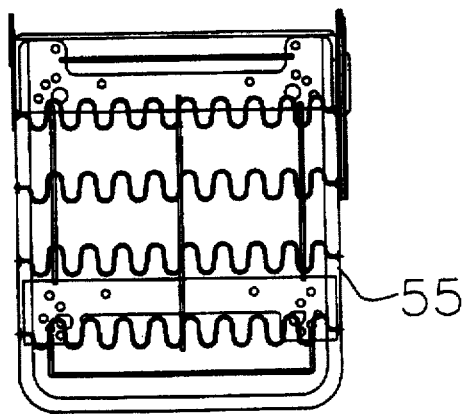

Referring now to the drawings, FIGS. 1–3 reveals a motor vehicle seat assembly 11 incorporating an anti-rattle arm brackets 20, 21 in accordance with a preferred embodiment. The seat cushions and back cushions 80 commonly used on seat assemblies have been removed for clarity of illustration. FIG. 1 shows a seat back 58, with left and right anti-rattle arm brackets 20, 21, respectively. FIG. 3 shows a seat base 55, and FIG. 2 is a side view showing the seat base 55 connected to the seat back 58 by a hinge assembly 60, allowing pivotable motion of the seat back relative the seat base. For seat assemblies used in automotive applications, for example, van conversions, the seat base is typically attached to a seat track assembly which allows for fore and aft sliding motion in the vehicle.

Figure 4:
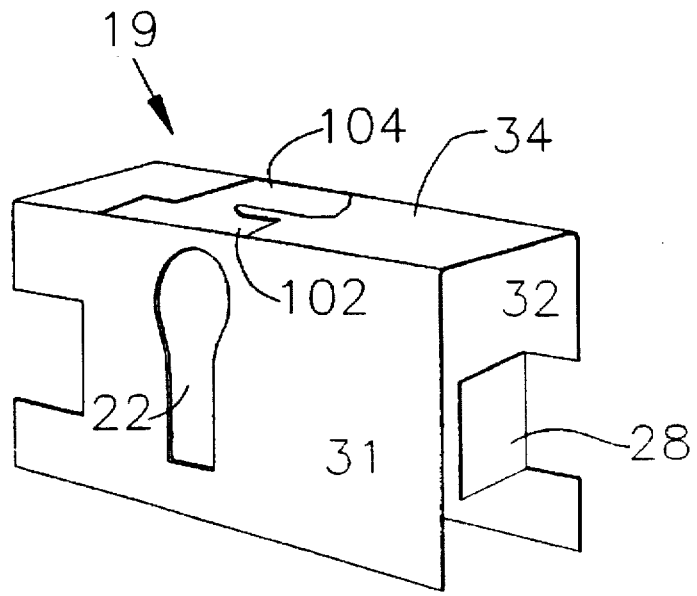
FIG. 4 is a known armrest bracket, left side, showing a pair of pin receiving channels.
Figure 5:
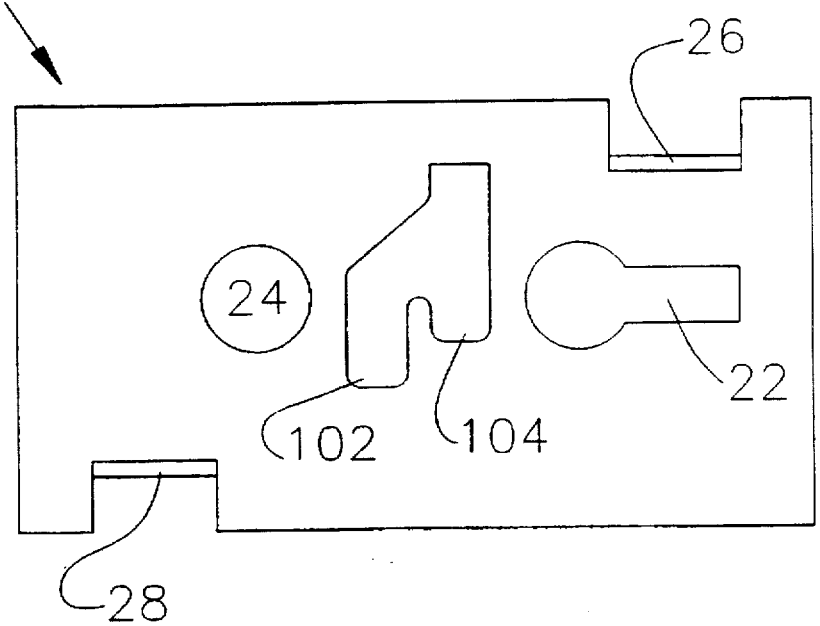
FIG. 5 is a known armrest bracket plate, right side, shown prior to bending into the assembly position.

FIGS. 4 and 5 show a known design for an arm bracket 19. FIG. 4 shows a left side arm bracket viewed from FIG. 1. The bracket can accommodate more than one type of armrest. A pin extending from an arm (not shown) is insertable into either a first pin channel 102 or a second pin channel 104. In either case, the diameter or width of the pin channels exceeds the diameter of the pin, allowing for rattling between the pin and the arm bracket when subjected to vibrational forces common in motor vehicles. FIG. 5 shows a right side version of arm bracket plate 16 as a metal stamping after the rod and pin openings 22, 24 and the pin channels have been cut, but before the three sides are bent into assembly position.

Figure 6:
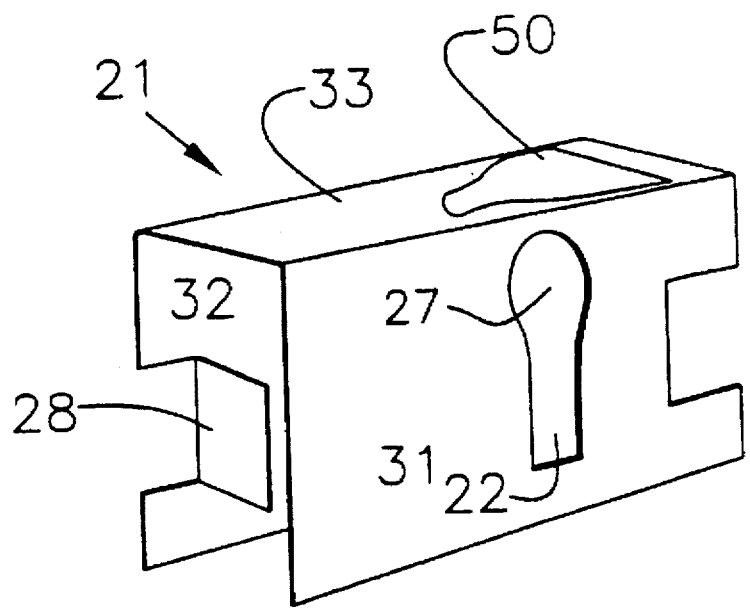
FIG. 6 is a perspective view of the anti-rattle arm bracket (right side as seen in FIG. 1) in accordance with a preferred embodiment of the present invention.
Figure 7:
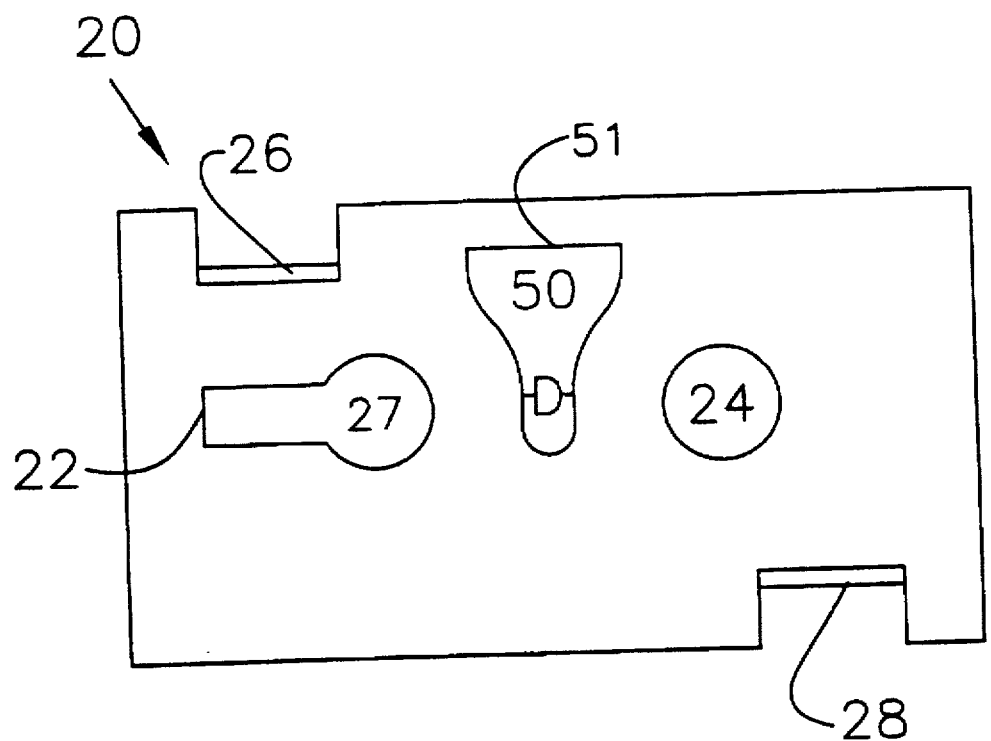
FIG. 7 is the anti-rattle arm bracket plate (left side) prior to bending into the assembly position of FIG. 6.

FIG. 6 and 7 show the right and left side versions of the improved arm brackets 21, 20 respectively. Arm bracket 21 is seen to have first, second and third walls or sides, 31, 32, 33, respectively, bent into a three-walled box configuration, thereby defining an interior of the arm bracket. The first and second walls 31, 32 are preferably generally parallel to one another and are connected by the third wall 33. To maintain low costs and to simply manufacturability, arm brackets 20, 21 are preferably formed from a single metal stamping, as best shown in FIG. 7. First and second openings 22, 24 for receiving the pin 40 and the rod 30 are stamped into the plate, as well as a pin-receiving groove 50, for receiving pin 40, described in detail below. The frame 58 of the seat back fits between the first and second walls 31, 32 of each arm bracket. Each arm bracket has alignment tabs 26, 28, visible on FIGS. 6, 7 and 10, which aid in proper alignment between the frame 58 of the seat back and the arm bracket.

Figure 8:
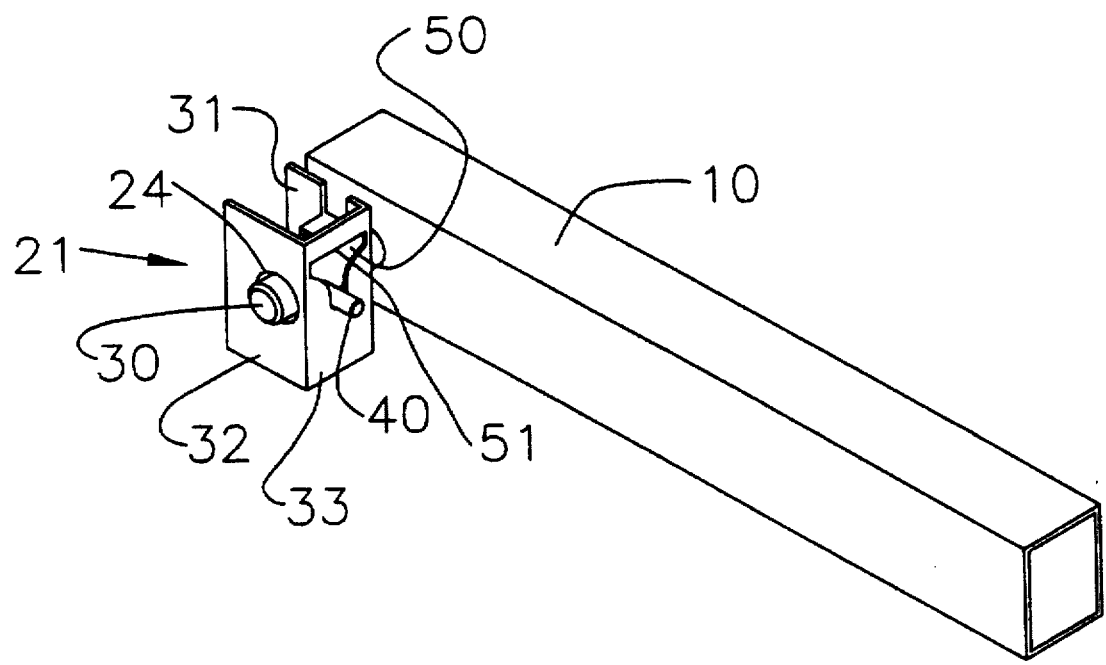
FIG. 8 shows the anti-rattle armrest of FIG. 6 with the arm in the down position, inserted into the Y-shaped receiving groove with at least an interference fit.
Figure 9:
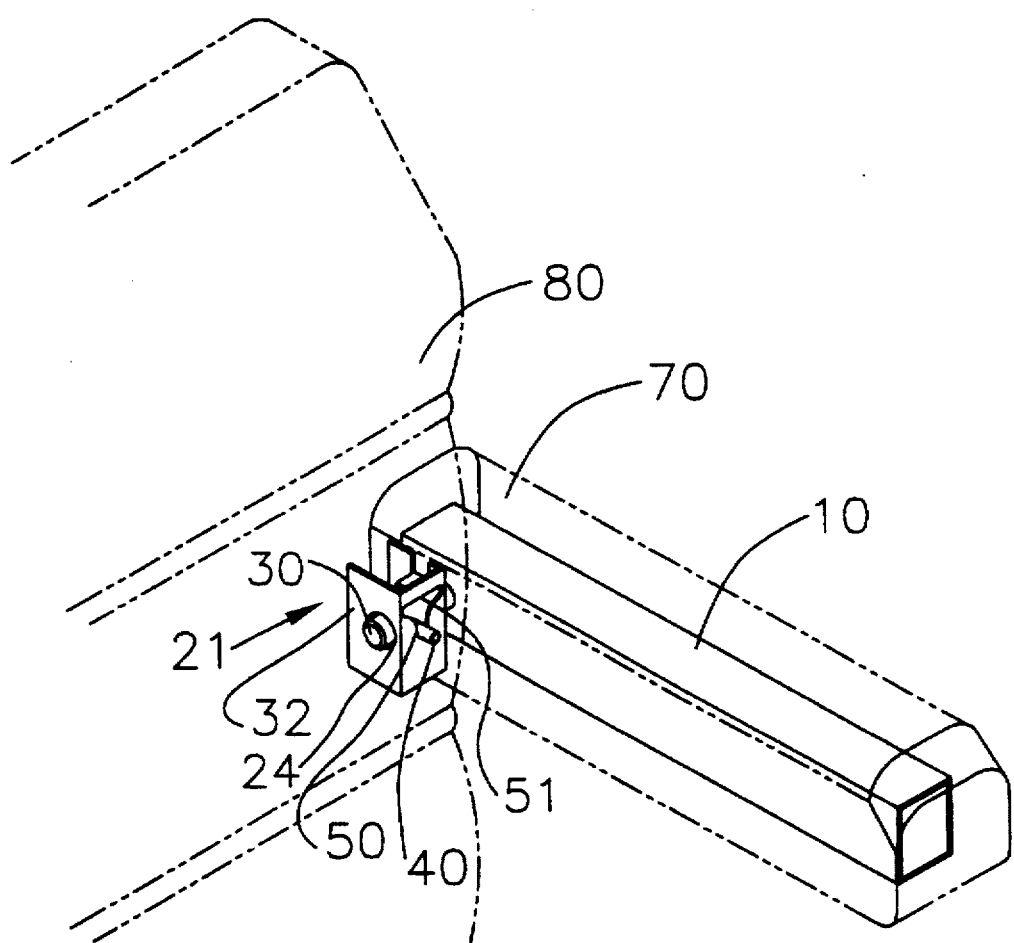
FIG. 9 is a view of a preferred embodiment showing cushioning material (in dotted lines) positioned over the seat assembly and between the arm and the armrest bracket.
Figure 10:
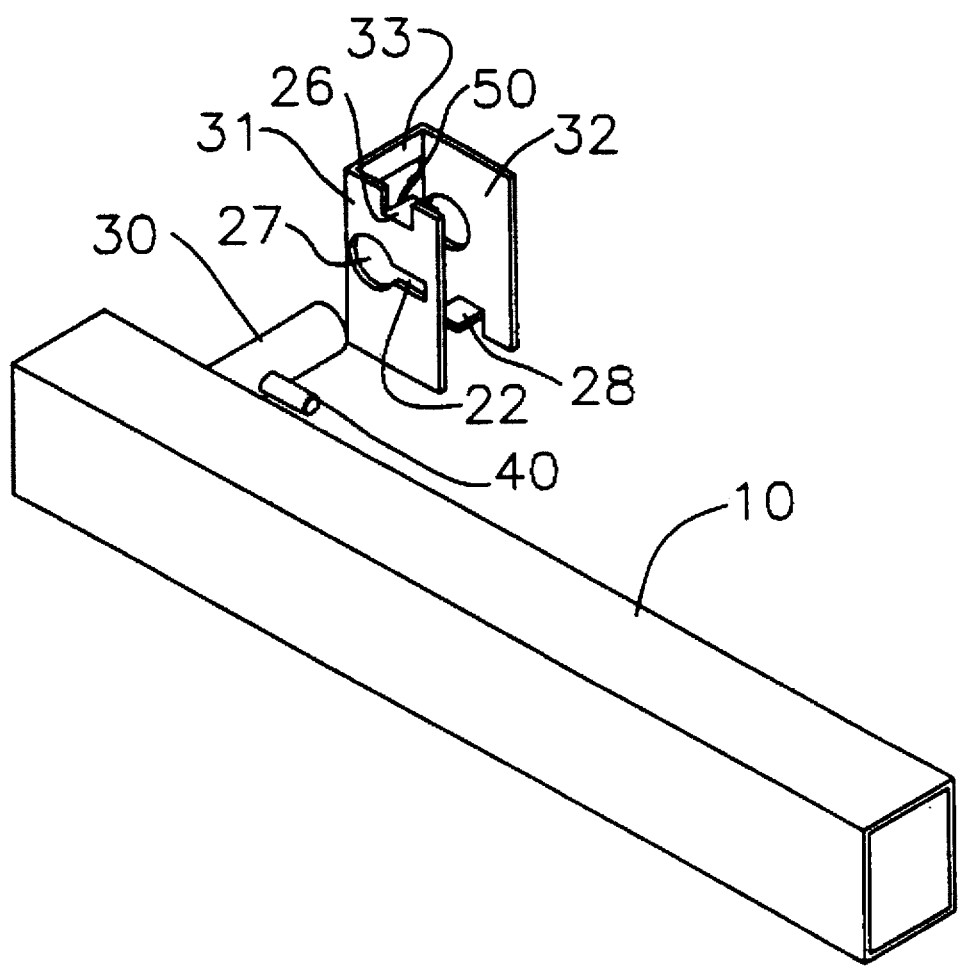
FIG. 10 is an exploded perspective view of the armrest showing the arm in a cocked position allowing for insertion of the rod and the pin into the keyhole shaped opening.

FIGS. 8–10 show the arm 10 with the rod 30 and how they attach to the arm bracket. First opening 22 on first wall 31 has a generally circular section 27 sized to receive rod 30 extending from arm 10. The rod is preferably fixedly attached to the arm as by, for example, welding, and slidably and rotatably attached to the arm bracket 21. The first opening 22 is also sized to receive pin 40. The rod 30 extends into generally circular second opening 24 in second wall 32. In response to movement of arm 10 the rod may rotate and/or slide relative the arm bracket. The arm bracket has a Y-shaped pin-receiving groove 50 having a top edge 51 and a bottom or stem. As shown in FIG. 7, the arm bracket plate, which is bendable into a three sided box configuration bracket, has keyhole 22 and second opening 24 aligned with the stem of the Y-shaped pin-receiving groove 50.

FIG. 10 shows the arm in a cocked position, aligning the pin with the keyhole shaped first opening. Once the rod and pin are inserted past the first opening 22, the arm may be rotated into the down position. As the arm is rotated, the pin clears the top edge 51 of the Y-shaped receiving groove 50 and is received in the bottom to the normal down position shown in FIGS. 8 and 9.

It can be difficult to maintain tight tolerances of the arm bracket without secondary operations which would significantly increase the cost of manufacturing an armrest. In a highly advantageous feature of the invention the pin has a diameter larger than the groove width D in pin-receiving groove 50 to produce at least a force fit or other interference fit and more preferably a wedge fit. This creates a tight but releasable fit between the arm and the arm bracket which advantageously greatly reduces rattling as the arm is moved to the down position and while the arm is in the down position. The arm 10 is pivotably moveable from a normal, down position in which the pin 40 is snugly positioned in the groove 50 to an up position which can be generally parallel with the seat back 58. The arm 10 is shown in the down position in FIGS. 8 and 9 where the pin fits tightly by at least interference fit into the pin receiving groove 50, most preferably by a wedge fit. The receiving groove 50 may be Y-shaped so that the pin may be guided to the center of the receiving groove.

In accordance with general engineering principles applicable to the design and manufacture of seats of this type, an interference fit here means that groove 50 has a slot width D of up to 0.01% smaller than the diameter of the pin. Likewise, a wedge fit here means an even tighter interference fit which even better accommodates wear due to repeated cycling, that is, raising and lowering of the arm. In a wedge fit the opening or groove is, relative the pin, smaller than in an interference fit, increasing the interference between the pin and the pin receiving groove 50. In a wedge fit the width D of the opening or groove is approximately 0.070–0.140 times smaller than the diameter of the pin. The groove is deliberately undersized to account for deflection and wear due to repeated cycling. In one preferred embodiment having a wedge fit, the pin has a diameter of 0.375 inches, and the groove has a width of 0.335 inches. In this manner, as the arm 10 is moved to the down position it snugly engages the center of groove 50 and rattling and other noises are minimized by the fit between the groove and the pin.

Similarly, rod 30 preferably has a close tolerance fit in hole 24 and in the circular portion of hole 27. Specifically, for example, rod 30 may have an outside diameter of about 0.749 to 0.750 inch and holes 24 and 27 have an inside diameter of about 0.750 to 0.754 inch. This contributes substantially to the anti-rattle characteristics of the arm and arm bracket assemblies disclosed here. Also in this regard, preferred embodiments employ arm covering material 70 including, typically, compressible foam and covering fabric. When the arm is in its up position on the vehicle seat, the tight tolerance fit between rod 30 and rod holes 24, 27 advantageously reduce rattling. Compression of arm material may also reduce rattle when the arm is in the up position. As the arm is moved from the up position to its down position, and especially when pin 40 clears edge 51 and enters Y-shaped groove 50 (typically about the last 45° of travel), foam compression occurs. In preferred embodiments, such foam compression in the down position substantially reduces or even eliminates rattle.

From the foregoing disclosure and detailed description of certain preferred embodiments, it will be apparent that various modifications, additions and other alternative embodiments are possible without departing from the true scope and spirit of the invention. For example, the fit between the pin and the receiving groove may be an interference fit such as a tight fit, a medium force fit, a heavy force fit or a wedge fit. The embodiments discussed were chosen and described to provide the illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An armrest for a seat assembly comprising, in combination: a longitudinal arm member;

a rod rigidly extending laterally from the arm member;

a pin extending radially from the rod; and an arm bracket operatively receiving the rod and the pin, for pivotable movement of the arm member relative to the arm bracket from an up position to a down position, the arm bracket having a Y-shaped pin-receiving groove, wherein the pin has a diameter which exceeds the width of the pin receiving groove for snugly receiving the pin upon movement of the arm member into the down position.

2. The armrest of claim 1 wherein the arm bracket further comprises first and second openings which slidably receive the rod, the first opening sized to allow passage of the pin into an interior of the arm bracket.

3. The armrest of claim 1 wherein the pin has a diameter of about 0.375 inches, and the receiving groove has a diameter of about 0.335 inches.

4. The armrest of claim 1 wherein the pin is snugly releasably insertable into the pin receiving groove with an interference fit.

5. The armrest of claim 1 wherein the pin is snugly releasably insertable into the pin receiving groove with a wedge fit.

6. The armrest of claim 1 wherein the arm bracket has at least three walls, the first and second walls being generally parallel one another and having openings to allow the rod to slide relative the arm bracket and the third wall connecting the first and second walls.

7. The armrest of claim 6 wherein the arm bracket further comprises upper and lower alignment tabs for alignment of the arm bracket with the seat assembly.

8. The armrest of claim 6 further comprising a seat back pivotably attached to a seat base, wherein the arm bracket is attached to the seat back.

9. The armrest of claim 6 wherein the pin is positioned between the first and second walls of the arm bracket, restricting slidable motion of the rod relative the arm bracket.

10. The armrest of claim 9 further comprising a cushioning material covering at least part of the arm.

11. The armrest of claim 10 wherein a portion of the cushioning material is positioned between the first wall of the arm bracket and the arm.

12. The armrest of claim 10 wherein the cushioning material biases the pin away from a center of the pin receiving groove.

* * * * *

UNITED STATES PATENT AND TRADEMARK OFFICE
CERTIFICATE OF CORRECTION

PATENT NO. : 5,720,525
DATED : February 24, 1998
INVENTOR(S) : Thomas C. Rumler

It is certified that error appears in the above-identified patent and that said Letters Patent is hereby corrected as shown below:

On the title page: Item [73] should read --Excel Industries, Inc.--.

Signed and Sealed this

Seventeenth Day of August, 1999

Attest:

Q. TODD DICKINSON

*Attesting Officer*    *Acting Commissioner of Patents and Trademarks*